United States Patent [19]

Walling

[11] Patent Number: 5,377,254
[45] Date of Patent: Dec. 27, 1994

[54] X-RAY CASSETTE CASING

[76] Inventor: Michael A. Walling, 511 W. 9th St., Antioch, Calif. 94509

[21] Appl. No.: 79,274

[22] Filed: Jun. 21, 1993

[51] Int. Cl.⁵ .............................................. G03B 42/04
[52] U.S. Cl. .................................... 378/167; 378/177; 378/204
[58] Field of Search ............... 378/167, 177, 178, 179, 378/180, 182, 184, 204

[56] References Cited

U.S. PATENT DOCUMENTS

| | | | |
|---|---|---|---|
| 3,829,699 | 8/1974 | Auspach, Jr. ........................ | 378/167 |
| 3,843,041 | 10/1974 | Oliverius .......................... | 378/167 X |
| 4,961,502 | 10/1990 | Griffiths .......................... | 378/167 X |
| 5,178,278 | 1/1993 | Oliverius .......................... | 378/167 X |
| 5,185,776 | 2/1993 | Townsend .......................... | 378/167 |

Primary Examiner—David P. Porta
Attorney, Agent, or Firm—Bielen, Peterson & Lampe

[57] ABSTRACT

A casing for x-ray cassettes for comfort of a patient during x-ray procedures, the casing being fabricated of a padded material with a surface that can be cleaned and disinfected, the casing being flat and generally square in configuration with corner handles for adjustment of the casing when used against a patient.

12 Claims, 1 Drawing Sheet

X-RAY CASSETTE CASING

BACKGROUND OF THE INVENTION

This invention relates to an x-ray cassette casing for use in medical applications where a patient is ordinarily in direct contact with an x-ray cassette. An x-ray cassette is a cartridge container for holding x-ray film. The cartridge has a rigid radiolucent shell encased in part by a plastic and/or metal perimeter frame. To the touch, the x-ray cassette is hard and is generally comparatively cold.

During the process of taking an x-ray, the patient is customarily moved against the x-ray plate for optimum positioning open exposure. Frequently, the x-ray cassette is placed vertically against a patient or under a patient or affected area of a patient while on a guerney, stretcher, bed, x-ray table or other surface. The hard, cold surface of the x-ray cassette often causes an abrupt reactive movement from the patient that will interfere with the x-ray image if the movement occurs during the moment of the exposure time, or if it alters the position of the patient at the moment of the exposure time. Such movements may necessitate a repeat exposure with the attendant additional costs and x-ray dosage. If the movement is not detected by the operator at the time of initial imaging, then the entire procedure must be repeated after the x-ray film is developed and reviewed.

A further problem with the use of existing x-ray cassettes is the potential contamination of the cassette by the patient who is often suffering a physical trauma and is losing blood or other bodily fluids, or, the patient may be suffering a communicable disease that can be transferred to the cassette. Similarly, other non-toxic debris may be shed from a casting material such as plaster of paris, or other image contrasting materials. The hard surface and sharp edges of the x-ray cassette may exacerbate the chipping of plaster of paris from a patient's cast or scrape a patient's skin surface. Furthermore, the hard surface and sharp edges of an x-ray cassette may cause pain and discomfort to a patient suffering a bone fracture.

These and other problems that have become apparent in the use of existing rigid x-ray cassettes have prompted the invention of the x-ray cassette casing, described herein. Modern x-ray cassettes are found to be uncomfortably surfaced, and difficult to keep clean. Time spent cleaning a cassette before removing the exposed film can be a critical factor in some emergent situations.

SUMMARY OF THE INVENTION

This invention relates to a casing for x-ray cassettes or other cartridge-type film containers against which a medical patient must be positioned during exposure of the film within the container. An x-ray cassette is a flat, rectangular container for x-ray film of largely radiolucent material that protects the film and maintains the film flat during exposure. The container is sealed by a perimeter frame of rigid material that is not necessarily fabricated of radiolucent material. The frame provides structural integrity to the container and customarily has a locked door along one edge for insertion and removal of the contained x-ray film. Positioning of the x-ray emitter is customarily calculated according to the location of the patient's body part against the flat surface of the cassette. Because the materials used in constructing the cassette are selected to provide a structural rigidity in the cassette, this surface of the cassette feels cold and hard to the touch and may cause discomfort or an unwanted movement or rotation by the patient upon contact with the cassette or while in contact with the cassette.

The x-ray cassette casing of this invention comprises a padded covering of radio-transparent or radiolucent material with an opening to allow insertion and removal of the x-ray cassette from the casing. The casing is sized and configured to snugly encase the flat cassette. In the preferred embodiment, the casing has corner tethers that are formed in a loop to provide a convenient means to adjust the position of the contained cassette with minimal discomfort of the patient when the encased cassette is placed under or against the patient. The padded material of which the x-ray cassette casing is fabricated may comprise a closed-cell latex or polymer foam sheeting cut and assembled into a cassette conforming shell. Preferably, the foam sheeting is covered top and bottom with a thin skin of protective fabric or plastic material that is textured to maximize comfort and minimize contamination. The protective skin facilitates cleaning of the casing with disinfectant solvents.

The materials for both the padding and surface covering are preferably sterilizable by antiseptic cleaners. The casing is formed with stitched or thermal press seams and includes a opening with a flap for inserting the x-ray cassette. At each of the four corners of the generally square cassette casing, are handles that allow a technologist to position the casing and contained cassette under a patient. The handles are preferably formed of loops that function as tethers to allow separate adjustment from each corner of the casing. The handles may comprise a pair of corner-to-corner loops on each of two or four sides of the casing, if desired. However, the preferred embodiment shown, best facilitates the positioning function. The handles provide a convenient means to carry the casing and contained cassette which is protected from inadvertent damage from spills or collisions during transport in the protective casing.

These and other features of the invented x-ray cassette casing will become apparent upon consideration of the detailed description of the preferred embodiment that follows.

DETAILED DESCRIPTION OF THE PREFERRED EMBODIMENTS

Figure 1:
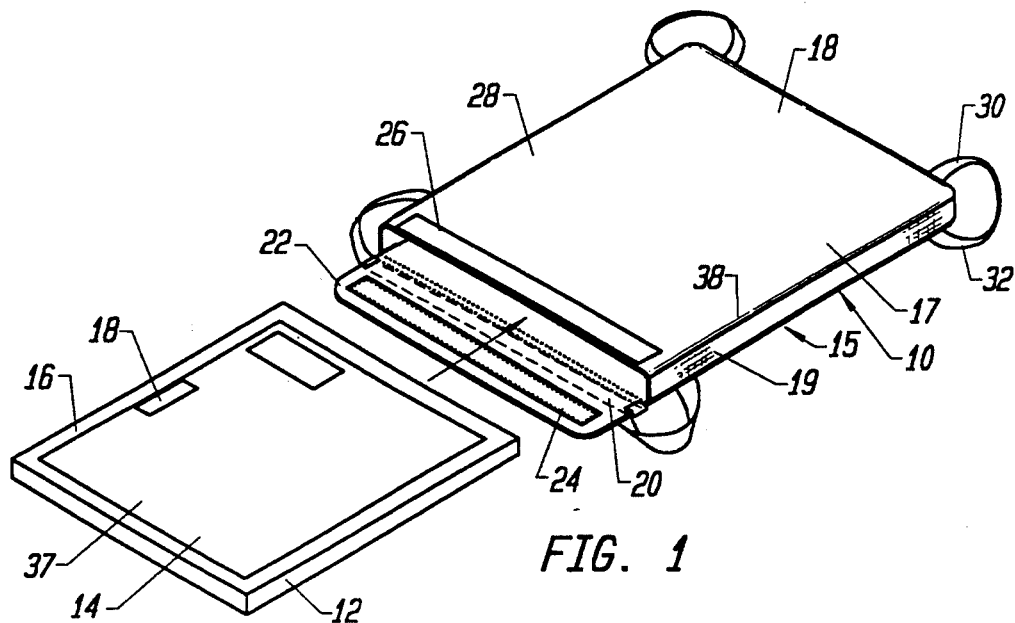
FIG. 1 is a perspective view of the x-ray casing of this invention together with an x-ray cassette that is shown removed from the casing.

The x-ray cassette casing 10 is shown in FIG. 1 with a standard x-ray cassette 12 measuring 15 inches by 18 inches. The cassette casing 10 is generally rectangular in configuration and sized to snugly encase an x-ray cassette 12 of the type shown. It is to be understood that for cassettes of different size, the cassette casing is sized accordingly.

The x-ray cassette 12 has an x-ray film (not visible) sandwiched between radiolucent panels 14 structurally maintained by a relatively rigid frame 16. The frame has an access release mechanism 13 to allow the film to be removed from the cassette 12.

The cassette casing 10 is constructed with a liquid impervious outside skin 18 of radiolucent material such as a fabric or plastic that is easily wiped by a suitable antiseptic cleanser. The outside skin provides a waterproof shell for the contained cassette. Preferably, the entire casing can be thermally treated, for example in an autoclave, for sterilization of the casing. The casing 10 is shown inverted, constructed as a flat, almost square shell with top exposure face 15 and a bottom flap face 17, according to the configuration of the film cassette. A continuous nylon web belt 19 encompasses the entire perimeter of the casing. The belt 19 provides structural integrity to the casing and provides an anchor location for straps. One edge 20 of the shell has a flap 22 with one hook and pile strip 24 mounted on the inside of the flap 22, that engages a complementary hook and pile strip 26 on a flat back surface 28 of the casing 10. The material of the outer skin 18 of the casing is textured to minimize sticking to the patient's skin on contact and maximize comfort during use. As shown in FIG. 1, the casing 10 has tethers 30 at each corner formed of looped straps 32 connected to the belt to facilitate positioning of the casing and contained cassette when positioned under or against a patient with minimal discomfort to the patient.

Figure 2:
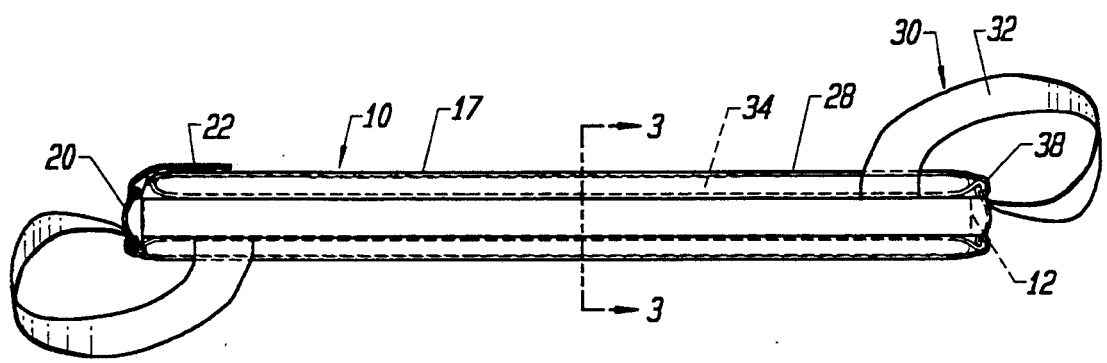
FIG. 2 is a side elevational view of the x-ray cassette casing of Fig. 1 with the casing containing the x-ray cassette.
Figure 3:
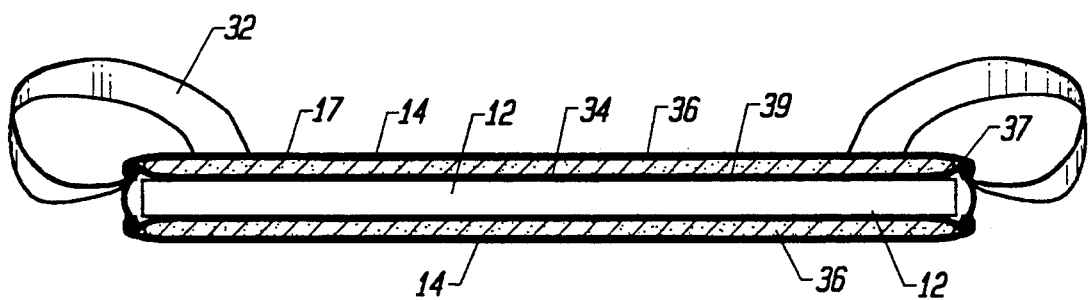
FIG. 3 is a cross sectional view of the x-ray cassette casing and cassette, taken on the lines 3—3 in FIG. 2.

Referring now to FIGS. 2 and 3, the casing 10 has an liquid impervious inside skin 34 as well as the outside skin 18. The inside and outside skin protects a layer of closed cell foam 36 that is also of a radiolucent material such that the casing 10 does not interfere with the quality of the x-ray film being exposed and processed. The foam 36 is of variable thickness to provide a comfortable contact composition to the casing. The flap side 17 of the casing, that is placed against the backside 37 of the cassette contains a stiffener 39 to preserve the form of the casing. As this side does not contact the patient, the foam 36 may be eliminated in back of the cassette. In addition to the textured surface of the protective skin, the padded composition substantially reduces the cold contact effect of the flat rigid faces of the unprotected cassette.

The sides and the top and bottom faces of the casing are secured with beaded seams 38 to the belt 19 eliminates rough edges that may snag on a patient or his clothing or bedding during use. The four corner hand straps 32 supplement as a convenient means to carry the encased cassette. The casing 10 is primarily designed for the comfort of a patient during x-ray procedures, but also provides a protective container for the cassette during transport and handling.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A reusable padded casing for x-ray cassettes comprising:
   a covering formed of x-ray translucent material configured into a flat, generally rectangular shell to snugly contain an x-ray cassette, the casing having an outer protective skin of liquid-impervious, material cleanable by an antiseptic cleaner, wherein the casing is constructed with flat faces forming a top and a bottom and four sides forming a perimeter, wherein the shell has at least one opening through which the cassette is insertable and removable, wherein at least one of the flat faces includes a pad x-ray translucent material located under the outer protective skin for the comfort of a patient in contact with a casing containing a rigid x-ray cassette.

2. The casing of claim 1 wherein the opening has a closure means for enclosing the x-ray cassette in the casing.

3. The casing of claim 2 wherein the closure means comprises a flap having means to secure the flap to the shell.

4. The casing of claim 3 wherein the means to secure the flap to the shell comprises complimentary hook and pile strips.

5. The casing of claim 1 wherein the padded material comprises a closed-cell foam.

6. The casing of claim 1 having positioning means to position the casing and a contained cassette under a patient.

7. The casing of claim 6 wherein the casing has four corners and the positioning means comprises a tether proximate each of the four corners of the casing.

8. The casing of claim 7 wherein the tethers each comprise a looped strap.

9. The casing of claim 6 wherein the positioning means is attached to the perimeter of the casing and projects from the perimeter of the casing.

10. The casing of claim 9 wherein the positioning means comprises a plurality of looped straps with end portions attached to the perimeter of the casing and handgrip portions projecting from the casing.

11. The casing of claim 10 wherein the casing has four corners and the positioning means comprises four looped straps, wherein the handgrip portions are arranged around and project from each of the four corners.

12. The casing of claim 1 wherein the covering of both the top and bottom are padded.

* * * * *